Feb. 9, 1971   R. R. DAVISON   3,562,152
OSMOSIS, REVERSE OSMOSIS PROCESS
Filed May 29, 1968
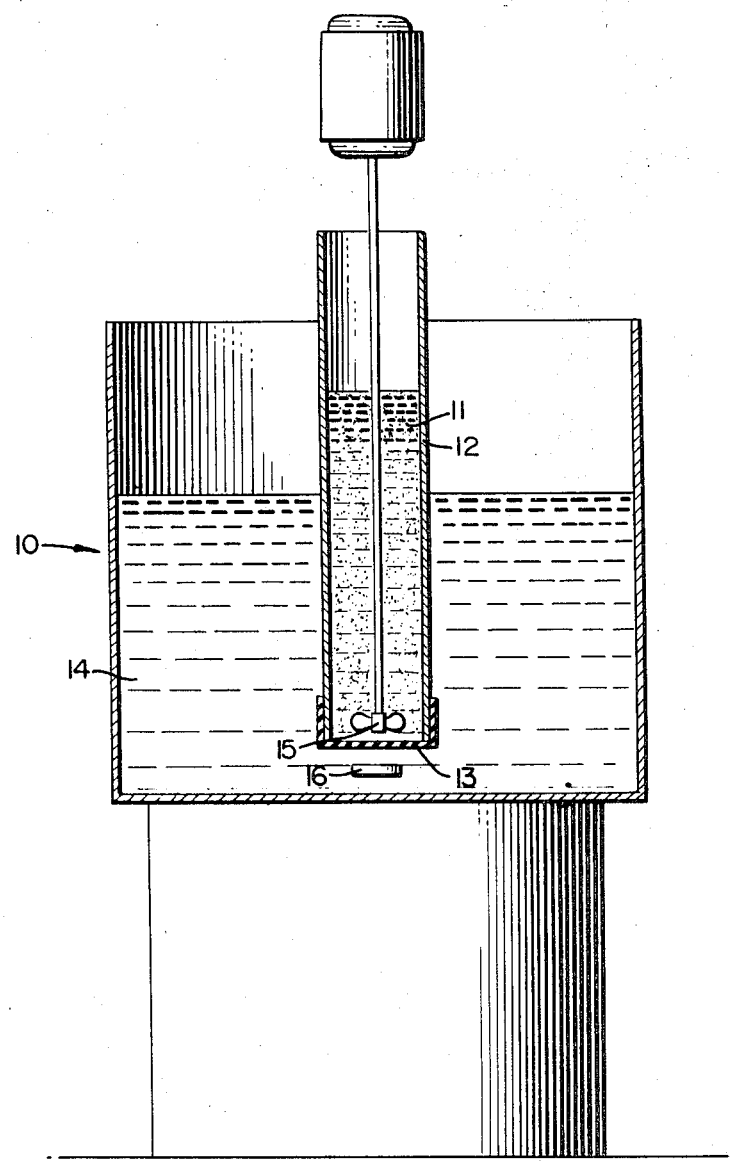
INVENTOR
RICHARD R. DAVISON
*Stowell & Stowell*
ATTORNEYS United States Patent Office 3,562,152
Patented Feb. 9, 1971

3,562,152
OSMOSIS, REVERSE OSMOSIS PROCESS
Richard R. Davison, Bryan, Tex., assignor to Research Corporation, New York, N.Y., a nonprofit corporation of New York
Filed May 29, 1968, Ser. No. 733,161
Int. Cl. B01d 13/00
U.S. Cl. 210—22                          2 Claims

ABSTRACT OF THE DISCLOSURE

Water is transferred between aqueous solutions by contacting an aqueous saline solution on one side of a semipermeable membrane, the other side of which is in contact with an aqueous solution of a polyelectrolyte at a higher osmotic pressure, whereby water diffuses across the membrane from the saline solution to the polyelectrolyte solution.

Essentially pure water is recovered from an aqueous saline solution by contacting the saline solution on one side of a semipermeable membrane, the other side of which is in contact with an aqueous solution of a polyelectrolyte at a higher osmotic pressure, whereby water diffuses across the membrane from the saline solution to the polyelectrolyte solution, separating at least a portion of the resultant less concentrated polyelectrolyte solution, and separating water from the less concentrated polyelectrolyte solution by reverse osmosis through a second semipermeable membrane thereby reconcentrating the polyelectrolyte solution. The reconcentrated polyelectrolyte solution may be recycled to the first step of the process.

This invention relates to osmotic methods for the separation of water from aqueous solution. In one specific aspect, it relates to a method for the recovery of pure water from saline or other impure waters.

The fundamental problem in reclaiming water from saline or other impure waters is the separation of pure water from water-soluble salts. Water purification systems based on osmosis utilize a semipermeable membrane capable of permitting water to diffuse therethrough while rejecting the solutes. The net result of diffusion across a boundary membrane separating two solutions of differing solvent activity is the passage of water from the more dilute into the more concentrated solution. Reverse osmosis involves the application of pressure in excess of the osmotic pressure of the solution to force the passage of solvent through the membrane in the reverse direction.

Purification systems based on reverse osmotic separations are of particular interest because of the inherent simplicity and efficiency of the separation step; osmosis is effected at ambient temperatures and no change of state or latent heats are involved as in distillation or freezing processes. However, the twin practical problems in such systems of short membrane life and low salt rejection or selectivity at the relatively high operating pressures required in order to achieve a significant rate of flux of water across the membrane have not yet been overcome.

We have now discovered a two-step process for the recovery of pure water from saline water which avoids the problem of providing a single membrane which is both highly selective and capable of withstanding the high pressures of reverse osmosis. This is accomplished via a novel combination of osmosis and reverse osmosis procedures using a polyelectrolyte solution as an intermediate osmotic carrier.

It is, therefore, a principal object of the present invention to provide an improved method for the separation of pure water from saline water.

It is a further object of the invention to provide a novel method for the transferring of water from an aqueous solution to a second aqueous solution of higher osmotic pressure.

It is yet another object of the present invention to provide a reverse osmosis procedure wherein the usual salt selectivity requirements for the membrane are avoided.

These and other objectives and advantages of the present invention will become apparent on consideration of the drawing, which illustrates the passage of water from one aqueous solution to another of higher osmotic pressure, and of the discussion and examples which follow.

In its broadest aspect, the present invention is a method for the transport of water which comprises contacting an aqueous saline solution with one side of a semipermeable membrane, the other side of which is in contact with an aqueous solution of a polymeric polyelectrolyte at a higher osmotic pressure, whereby water passes from the saline solution to the polyelectrolyte solution. In another more specific aspect, the present invention is a method for the recovery of essentially pure water from an aqueous saline solution which comprises contacting an aqueous saline solution with one side of a semipermeable membrane, the other side of which is in contact with an aqueous solution of a polyelectrolyte at a higher osmotic pressure, whereby water diffuses across the membrane from the saline solution to the polyelectrolyte solution; separating at least a portion of the resultant less concentrated polyelectrolyte solution; and separating water from the polyelectrolyte solution by reverse osmosis, thereby reconcentrating the polyelectrolyte solution. The reconcentrated polyelectrolyte solutions may be recycled to the first step of the process.

In a preferred embodiment of the invention, the solutions on both sides of the osmotic membrane are stirred to keep concentration polarization at a minimum. Concentration polarization is the term used to describe the build-up of rejected salt at the surface of the membrane. Such a build-up of salt decreases the rate of flux of water across the membrane because of the increase in osmotic pressure of the salt solution in the area of the membrane and may also cause physical damage to a sensitive membrane. On the polyelectrolyte side of the membrane, concentration polarization consists in dilution and corresponding lowering of osmotic pressure.

In practicing the present invention, a highly selective salt-rejecting membrane is utilized as the osmotic membrane. The saline or other water to be purified is placed on one side of the membrane, and an aqueous solution of a high molecular weight polyelectrolyte having a higher osmotic pressure than the saline water is placed on the other side of the membrane. The difference in osmotic pressure between the solutions causes the net diffusion of water from the saline water solution through the membrane into the polyelectrolyte solution. The resultant less concentrated polyelectrolyte solution is then passed to a high pressure reverse osmotic cell generally containing a much less salt-selective membrane than utilized in the first or osmosis step. Water is separated by reverse osmosis and the reconcentrated polyelectrolyte solution may be returned to the osmotic cell for reuse in the water pick-up step.

The principal advantage of the present two-step method is that the relatively weak but highly selective salt rejecting membrane required for osmosis is not subject to the high pressures of reverse osmosis. The membrane used in the reverse osmosis cell would preferably be less salt-selective and designed to withstand higher pressures.

The improved results obtained with the method of the present invention are attributed at least in part to the use of an aqueous polyelectrolyte osmotic carrier or water transfer solution. With any solute other than a polyelectrolyte in the intermediate osmotic solution, either the molecular weight of the solute would have to be very low increasing the rejection requirement for the membrane, or a very high concentration would be required resulting in an extremely viscous solution and severe concentration polarization. Using a polyelectrolyte of relatively low equivalent weight, there is obtained the large number of particles required to increase osmotic pressure with a solute having a relatively large effective molecular diameter.

The particular polyelectrolyte utilized in the illustrative examples which follow was an aqueous solution of polyethylenamine chloride prepared by titrating polyethylenamine of molecular weight about 100,000 to a pH of 4.0 with hydrochloric acid. A non-limiting list of other polyelectrolytes also suitable for use in practicing the present invention would include polymeric quaternary ammonium halides, polyacrylate salts, salts of sulfonated polystyrenes and the like. The molecular weight of the polyelectrolyte utilized is not critical save that the molecules be sufficiently large so as not to pass through the pores of the particular membrane chosen for use in the reverse osmosis cell.

The membranes of choice for use in osmosis and reverse osmosis are usually made of cellulose acetate. However, the membranes may be fabricated from other materials which permit the diffusion of water therethrough. It is apparent that membranes intended for use in the osmosis cell must exhibit a very high degree of salt-selectivity. The membranes intended for use in the reverse osmosis cell need not be as salt-selective since they would not be used in conjunction with simple salt solutions. Membranes for the reverse osmosis cell should be selected in conjunction with the polyelectrolyte and have a pore size just sufficiently small to prevent passage of the polyelectrolyte; complete rejection of the polyelectrolyte in such systems is feasible.

Any appropriate osmosis and reverse osmosis apparatus may be used in the first and second steps of the present process, respectively. A particularly suitable osmosis cell for use in the first step is illustrated in the drawing. In operation, the cell 10 consisting of a glass tube 12 sealed across one end with a semipermeable membrane 13 and containing polyelectrolyte solution 11 is immersed at its membrane-covered end in a body of saline water 14. The membrane had an effective surface area for osmosis of about 2.85 square centimeters. In order to minimize concentration polarization, the polyelectrolyte solution 11 is stirred by means of a motor driven stirrer 15 and the saline solution 14 in the immediate area of the membrane 13 is stirred by means of magnetic stirrer 16. Stirring may also be accomplished by pumping the fluids past the membrane surface.

The reverse osmosis cell employed was a stainless steel high-pressure filter holder rated to withstand a line pressure of 5,000 p.s.i. and a differential pressure of 1,500 p.s.i. The membrane, which had an effective surface area of about 9.54 square centimeters, was placed on a sheet of filter paper and supported on a stainless steel screen. A nitrogen-operated back pressure regulator was used to control the pressure on the cell and a dual piston positive displacement pump was used to pump test solution through the cell at the rate of 2.8 gallons per hour.

Flow rates across the reverse osmosis membranes were determined by collecting the water in a graduated cylinder. Concentrations were determined by conductivity in products produced from saline waters and by chemical oxygen demand for water produced from polyelectrolyte solutions. Flow rates of water across the osmotic test membrane were calculated from changes in the concentration of the solutes with time. Osmotic rejection of sodium chloride by the membranes was determined using a flame spectrophotometer.

Representative results obtained on osmosis using highly selective cellulose acetate membranes having a rejection factor in excess of 97% for sodium chloride as the semipermeable membrane, aqueous polyethylenamine chloride as the polyelectrolyte solution, and various test saline solutions are summarized in the tables below:

TABLE 1.—14.2 WEIGHT PERCENT POLYETHYLENAMINE CHLORIDE AND 0.508 WEIGHT PERCENT SODIUM CHLORIDE AS INITIAL SOLUTIONS

| Total time in hours | Weight percent polymer | Weight percent sodium chloride |
| --- | --- | --- |
| 0.000 | 14.2 | 0.508 |
| 1.133 | 12.1 | 0.510 |
| 2.866 | 10.6 | 0.516 |
| 3.900 | 9.83 | 0.522 |
| 4.917 | 9.52 | 0.525 |
| 5.933 | 8.85 | 0.528 |
| 6.933 | 8.50 | 0.552 |
| 7.933 | 8.32 | 0.536 |
| 8.933 | 7.98 | 0.539 |
| 9.933 | 7.70 | 0.543 |
| 21.60 | 6.00 | 0.585 |
| 23.93 | 5.87 | 0.594 |
| 26.93 | 5.77 | 0.605 |
| 27.93 | 5.52 | 0.608 |
| 28.93 | 5.40 | 0.612 |
| 30.10 | 5.30 | 0.615 |
| 31.00 | 5.13 | 0.618 |
| 42.00 | 4.53 | 0.658 |
| 43.00 | 4.53 | 0.662 |
| 46.00 | 4.41 | 0.673 |
| 53.00 | 4.25 | 0.697 |
| 72.00 | 4.02 | 0.766 |
| 76.00 | 4.02 | 0.780 |

TABLE 2.—SEQUENTIAL RUNS STARTING WITH 14.2 WEIGHT PERCENT POLYETHYLENAMINE CHLORIDE AND 2.0 WEIGHT PERCENT SODIUM CHLORIDE AS INITIAL SOLUTIONS

| Run Number | Initial weight percent polymer | Final weight percent polymer | Run time in hours | Sodium chloride, weight percent |
| --- | --- | --- | --- | --- |
| 209 | 13.65 | 13.34 | 1.00 | 2.00 |
| 210 | 13.34 | 12.90 | 1.85 | 2.00 |
| 211 | 12.90 | 11.15 | 11.00 | 2.00 |
| 212 | 11.15 | 10.95 | 1.55 | 2.00 |
| 213 | 10.95 | 10.70 | 2.63 | 2.00 |

The experiment summarized in Table 3 used distilled water rather than a sodium chloride solution as the saline solution. The rate of flux for water given is calculated as gallons per day square foot of membrane. Other experiments have shown that the rate of flux decreases as the concentration of salt in the saline solution increases.

TABLE 3.—14.2 WEIGHT PERCENT POLYETHYLENAMINE CHLORIDE AND DISTILLED WATER AS INITIAL SOLUTIONS

| Total time in hours | Weight percent polymer | Water flux, gal./day/ft.$^2$ |
|---|---|---|
| 0.000 | 14.20 | 3.52 |
| 1.500 | 11.15 | 3.52 |
| 2.583 | 9.57 | 3.74 |
| 5.266 | 7.42 | 3.07 |
| 8.566 | 5.90 | 2.89 |
| 10.583 | 5.20 | 3.09 |
| 22.850 | 3.42 | 2.23 |

Various polyethylenamine chloride solutions, as prepared above, were passed through the reverse osmosis cell to recover water therefrom. The following comparative table using polyelectrolyte solutions of the same initial concentration illustrates the dependence of the rate of flux calculated as milliliters × 10$^3$ per second per square centimeter of membrane on the pressure applied across the membrane. Each group shown in Table 4 represents a different commercially available cellulose acetate membrane.

TABLE 4.—PRODUCT FLUX AS A FUNCTION OF PRESSURE FOR A 12 PERCENT BY WEIGHT POLYETHYLENAMINE CHLORIDE SOLUTION

| Run Number | Differential cell pressure (p.s.i.g.) | Water flux, cc./cm.$^2$ sec.×10$^3$ |
|---|---|---|
| 149 | 800 | 0.313 |
| 150 | 800 | 0.270 |
| 151 | 1,200 | 0.314 |
| 152 | 1,500 | 0.361 |
| 160 | 800 | 0.437 |
| 161 | 800 | 0.408 |
| 162 | 800 | 0.400 |
| 131 | 800 | 0.397 |
| 132 | 1,200 | 0.419 |
| 133 | 1,500 | 0.437 |
| 119 | 600 | 0.211 |
| 120 | 800 | 0.202 |
| 121 | 1,000 | 0.262 |
| 122 | 1,200 | 0.212 |
| 123 | 1,500 | 0.307 |
| 115 | 800 | 0.175 |
| 116 | 1,000 | 0.168 |
| 117 | 1,200 | 0.178 |
| 118 | 1,500 | 0.240 |
| 153 | 800 | 0.815 |
| 154 | 1,200 | 0.821 |
| 155 | 1,500 | 0.815 |
| 140 | 700 | 0.699 |
| 128 | 800 | 0.786 |
| 156 | 800 | 0.815 |
| 157 | 800 | 0.767 |
| 158 | 1,200 | 0.773 |
| 141 | 1,200 | 0.777 |
| 142 | 1,500 | 0.770 |
| 159 | 1,500 | 0.706 |
| 125 | 700 | 0.738 |
| 144 | 700 | 0.815 |
| 145 | 700 | 0.742 |
| 126 | 1,200 | 0.854 |
| 146 | 1,200 | 0.799 |
| 127 | 1,500 | 0.912 |
| 105 | 600 | 0.122 |
| 106 | 600 | 0.132 |
| 107 | 800 | 0.155 |
| 108 | 800 | 0.154 |
| 109 | 1,000 | 0.165 |
| 110 | 1,200 | 0.181 |
| 111 | 1,400 | 0.190 |
| 112 | 1,400 | 0.175 |
| 134 | 800 | 0.632 |
| 147 | 800 | 0.619 |
| 135 | 1,200 | 0.728 |
| 136 | 1,500 | 0.796 |
| 165 | 800 | 0.699 |
| 166 | 1,200 | 0.807 |
| 167 | 1,500 | 0.932 |

The highest product flux obtained was 19.5 gallons per day per square foot at 1500 p.s.i.g. differential cell pressure (the last series shown in the table). Rejection of polyelectrolyte by the membrane was complete.

I claim:

1. A method for the recovery of essentially pure water from an aqueous saline solution which comprises contacing the saline solution with one side of a semipermeable membrane, the other side of which is in contact with an aqueous solution of a polyelectrolyte at a higher osmotic pressure, whereby water passes from the saline solution to the polyelectrolyte solution; separating at least a portion of the resultant less concentrated polyelectrolyte solution; and recovering water from the less concecntrated polyelectrolye solution by reverse osmosis through a second semipermeable membrane, thereby reconcentrating the polyelectrolyte solution.

2. A method according to claim 1 wherein the reconcentrated polyelectrolyte solution is recycled to the first step of the process.

References Cited

UNITED STATES PATENTS

| | | | |
|---|---|---|---|
| 3,276,996 | 10/1966 | Lazare | 210—22 |
| 3,386,912 | 6/1968 | Lazare | 210—321X |
| 3,062,737 | 11/1962 | Azorlosa et al. | 210—22 |
| 3,234,126 | 2/1966 | Bloch | 210—59 |

FRANK A. SPEAR, Jr., Primary Examiner

U.S. Cl. X.R.

210—23, 321